United States Patent
Wunderlich et al.

[11] Patent Number: 6,106,479
[45] Date of Patent: Aug. 22, 2000

[54] BREATH SIMULATOR

[75] Inventors: Eric Wunderlich, Gilching; Robert Waldner, Peiting; Martin Knoch, Berg, all of Germany

[73] Assignee: PARI GmbH Spezialisten fur effektive inhalation, Starnberg, Germany

[21] Appl. No.: 09/052,734

[22] Filed: Mar. 31, 1998

[30] Foreign Application Priority Data

Apr. 2, 1997 [DE] Germany .............. 197 13 636

[51] Int. Cl.$^7$ ........................................... A61N 5/00
[52] U.S. Cl. ........................... 600/529; 128/200.12
[58] Field of Search ................... 600/529–538; 128/200.12, 200.14, 200.18, 200.24, 200.23

[56] References Cited

U.S. PATENT DOCUMENTS 5,485,850  1/1996  Dietz ............................... 600/529
5,590,648  1/1997  Mitchell et al. ................. 600/529

FOREIGN PATENT DOCUMENTS

| 30 44 639 C2 | 5/1983 | Germany . |
| 32 28 958 A1 | 2/1984 | Germany . |
| 34 17 425 A1 | 4/1985 | Germany . |
| 251 706 A1 | 11/1987 | Germany . |

*Primary Examiner*—Max Hindenburg
*Assistant Examiner*—Michael Astorino
*Attorney, Agent, or Firm*—Merchant & Gould, P.C.

[57] ABSTRACT

The invention relates to a breath simulator, which comprises a pump means (1) and a computer means (3). The computer means (3) controls the pump means (1) in such a manner that a stored breathing pattern of a patient is produced on a connecting piece (12) of the pump means. With the aid of the breath simulator, therapeutical nebulisers can be examined.

14 Claims, 1 Drawing Sheet

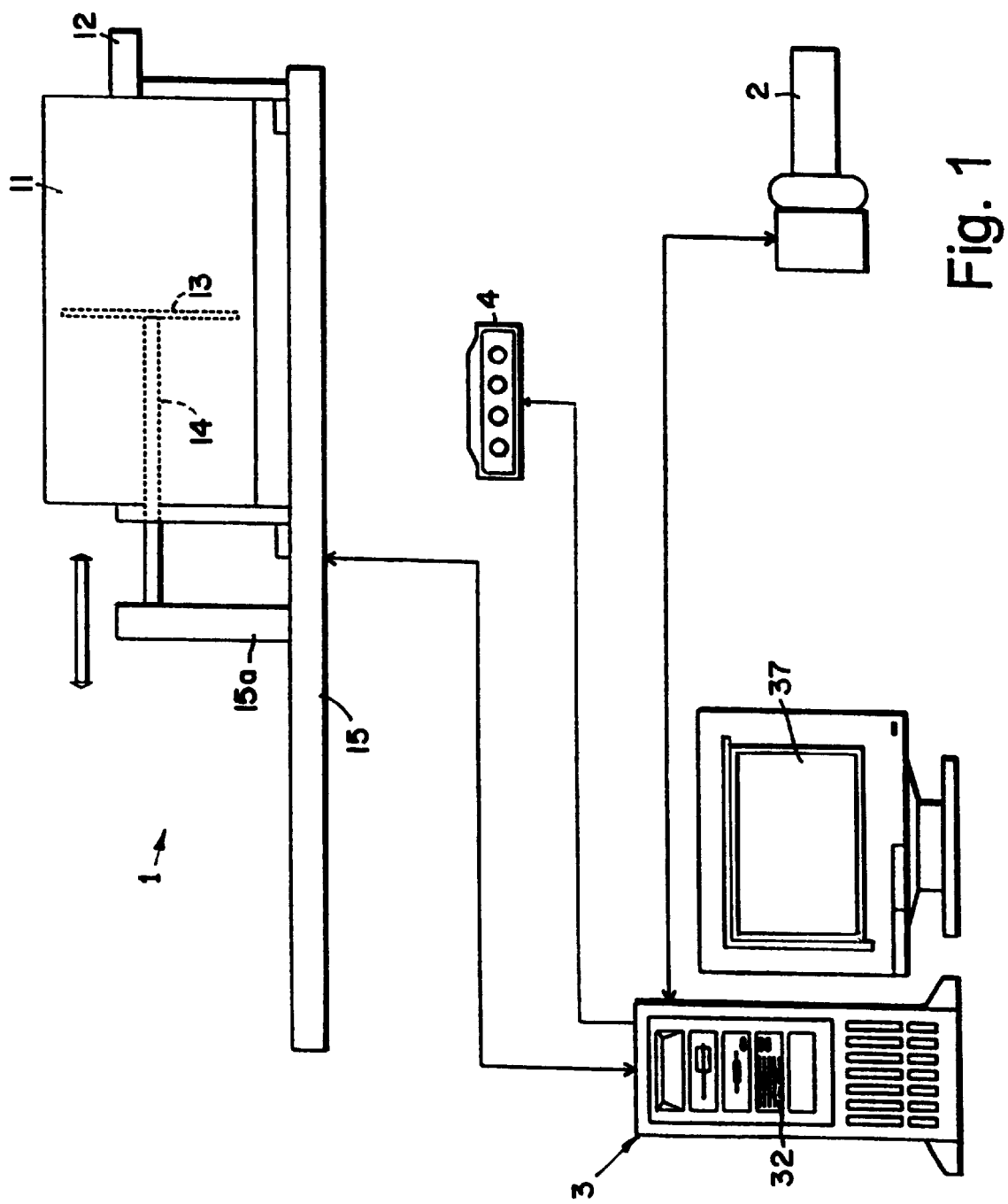

BREATH SIMULATOR

BACKGROUND OF THE INVENTION

The invention relates to a breath simulator, i.e. a system for simulation (and recording) of breathing patterns of healthy and sick persons.

SUMMARY OF THE INVENTION

During the development of effective therapeutical nebulisers, changes in construction must always be examined with respect to the manner and the degree in which the nebuliser performance is influenced. The nebuliser performance of a therapeutical nebuliser is judged on the basis of a plurality of criteria, including amongst others the amount of aerosol and the droplet spectrum. These two values are in direct correlation with the breathing behaviour of the patent, who breathes differently dependent on the nature and gravity of his disease. The breathing behaviour also differs from patient to patient and clearly differs in the comparison between healthy and sick persons. Until now these differences have only been considered insufficiently in the examination methods and test procedures used for therapeutical nebulisers.

SUMMARY OF THE INVENTION

In view of this situation, the object of the invention is to be seen in providing the basis for a reliable, experimental examination of therapeutical nebulisers.

The object is solved by a breath simulator for the simulation of breathing patterns with the features shown in patent claim 1.

The breath simulator according to the invention leads to the decisive advantage that by covering large groups of both healthy and sick people, a reliable basis is established on the foundation of which examinations can be carried out on therapeutical nebulisers with a reliability not yet achieved.

Moreover, a breath simulator is provided by the invention which permits a simulation of breathing patterns with a high accuracy of reproduction.

BRIEF DESCRIPTION OF THE DRAWINGS

The invention is described in the following in more detail on the basis of an embodiment and with reference to the drawing, which shows:

FIG. 1 a schematic representation of the construction of an embodiment of a breath simulator according to the invention.

DETAILED DESCRIPTION

The embodiment of the invention shown in FIG. 1 comprises a pump means 1, a recording means 2 and a computer means 3 which is connected both with the pump means 1 and with the recording means 2. The computer means 3 controls, the pump means 1 and evaluates output signals of the recording means 2. By evaluation of the output signals of the recording means 2, a breathing pattern is detected. By activation of the pump means 1, a breathing pattern is simulated.

However, the computer means can also be constructed so as to be separate for the pump means and the recording means, so that the recording of a breathing pattern can take place independent of the simulation. In this respect, the computer means and the recording means can be very compact, so that this unit is also suitable for mobile use. The data are then transmitted in a computer means connected with the pump means, for which suitable interfaces are provided. The transmission of the data can, however, also take place with the aid of a data carrier, for example a RAM card or a diskette.

In the embodiment shown in FIG. 1, the pump means 1 consists of a hollow cylinder 11 with a connecting piece 12, to which the therapeutical nebuliser (not shown) which is to be examined can be connected. In the hollow cylinder 11 of the pump means 1, there is a piston 13 with piston rod 14, which extends out of the hollow cylinder 11. The hollow cylinder is secured to a linear drive unit 15, the moved part 15a of which is secured to the piston rod 14, so that the piston rod 14 together with the piston 13 can be reciprocated in the hollow cylinder 11. The linear drive unit 15 can be activated in such a manner that the breathing pattern of a patient is simulated on the connecting piece 12 of the pump means 1. In addition, other breathing patterns can also be simulated.

The activation of the linear drive unit 15 takes place by the computer means 3, which can be a customary personal computer with suitable activation interface which is adapted to the linear drive unit 15. The customarily provided serial interfaces of the personal computer can be used as interface. The signals transmitted via the interface lead to the fact that the linear drive unit 15 moves the piston 13 in the hollow cylinder 11 of the pump means 1 with a predetermined speed in one of the two directions and thus generates an under- or over-pressure on the connecting piece 12. The activation can take place in such a manner that the speed with which the linear drive unit 15 moves the piston 13 reproduces the breathing behaviour of a patient with great accuracy, so that the pump means 1 simulates the breathing pattern of a patient on the connecting piece 12. The computer means 3 thus assumes the task of a control means for the linear drive unit 15.

The computer means 3 reverts in this respect to a stored breathing pattern wherein, for example, it is a case of a number of value triples (DIRECTION, SPEED, TIME). The value DIRECTION shows in what direction the piston 13 of the pump means 1 is to be moved, i.e. whether on the connecting piece 12 of the pump means 1 a pressure increase or decrease should be produced. The value SPEED shows with what increase the movement of the piston should take place. The value TIME shows for what period of time the change in pressure takes place. By a plurality of value triples, the breathing pattern of an arbitrary patient can be reproduced with high accuracy on the connecting piece of the pump means 1.

The computer means permits the user to select a (previously stored) breathing pattern via a display 31. The breathing patterns are deposited in this respect inside a breathing pattern library in certain categories or classes, from which the user selects the breathing pattern desired for the examination of the therapeutical nebuliser. The computer means 3 additionally offers the possibility of choosing a breathing pattern which is typical for a category or class which is obtained for example from the average of a plurality of breathing patterns which were recorded individually for individual patients with the same syndromes.

The recording of breathing patterns takes place with the aid of the recording means 2, which consists of a mouthpiece, a filter and a sensor. As sensor a pressure difference sensor can be used which detects via a pressure difference the flow of breath of the patient, who breathes in and out via the mouthpiece of the recording means 2. The recording means 2 is connected with the computer means 3, so that the respiratory flow measured values of the sensor are received by the computer means 3 and evaluated. The computer means 3 stores the respiratory flow measured values in a memory means 32 in a form which permits that on the basis of the stored measured values the above-described value triples, or a different measured value representation, are formed, with which the breathing behaviour of the patient, which was recorded with the aid of the recording means 2, can be simulated by activation of the pump means 1.

The data is preferably stored in such a manner that the computer means 3 builds up a breathing pattern library covering the breathing pattern of a large number of persons. Within the library, the breathing patterns are catalogued or typified, so that predetermined categories or classes are combined. Within the categories or classes, typical breathing patterns are selected or produced which are characteristic for the category or class.

In order to be able to carry out the evaluation by the computer means 3, and thus the test of a therapeutical nebuliser, on the basis of a large number of breathing patterns, the computer means 3 is connected in an advantageous configuration with a data transmission means 4. With the aid of the data transmission means 4, the computer means 3 can be connected with other computer means according to the invention or with specific data banks, in order to exchange the data of breathing patterns, for example the above-described value triples. In this manner, a breathing pattern library which is as representative as possible can be very rapidly formed.

We claim:

1. A breath simulator that simulates respiration of a patient for examination of a therapeutic nebulizer, comprising:
    a pump having a connecting piece for connection to a therapeutic nebulizer to be examined; and
    a computer in which a breathing pattern of a patient is stored, the computer controlling the pump so that the stored breathing pattern of a patient is produced at the connecting piece.

2. A breath simulator according to claim 1, wherein the stored breathing pattern of a patient is based on measured values of a breathing pattern of a patient.

3. A breath simulator according to claim 1, wherein the computer comprises a memory unit in which a plurality of breathing patterns are stored.

4. A breath simulator according to claim 3, wherein the plurality of stored breathing patterns are combined into classes according to predetermined criteria and a breathing pattern typical for a class of breathing patterns is provided.

5. A breath simulator according to claim 1, further comprising a data transmitter in communication with the computer for transmitting a breathing pattern to the computer.

6. A breath simulator according to claim 5, wherein the data transmitter connects the computer to a computer of a further breath simulator.

7. A breath simulator according to claim 1, further comprising a recorder connected to the computer for generating signals in response to a breathing pattern of a patient, with the computer evaluating the signals from the recorder and storing a corresponding breathing pattern.

8. A breath simulator according to claim 7, wherein the recorder comprises a mouthpiece for a patient and a sensor.

9. A breath simulator according to claim 8, wherein the sensor is a pressure sensor.

10. A system for recording a breathing pattern of a patient for use in examination of a therapeutic nebulizer with a breathing simulator, comprising:
    a recorder for recording a breathing pattern of a patient and generating a signal corresponding to the breathing pattern; and
    a computer connected with the recorder, which evaluates the signal of the recorder and stores a corresponding breathing pattern.

11. A system according to claim 10, wherein the recorder comprises a mouthpiece for a patient and a sensor.

12. A system according to claim 11, wherein the sensor is a pressure sensor.

13. A method of examining a therapeutic nebulizer, comprising:
    attaching a therapeutic nebulizer to a connecting piece of a pump; and
    controlling operation of the pump with a computer in which a breathing pattern of a patient is stored, the computer controlling the operation of the pump so that the stored breathing pattern of a patient is produced at the connecting piece.

14. A method according to claim 13, wherein the pump comprises a movable piston and the computer controls direction of movement, speed and time of movement of the piston in accordance with the stored breathing pattern.

* * * * *